(12) United States Patent
Bussey, Jr. et al.

(10) Patent No.: US 7,972,668 B2
(45) Date of Patent: Jul. 5, 2011

(54) FOAMED LAMINATED CONSTRUCTION

(75) Inventors: Harry Bussey, Jr., Marco Island, FL (US); Harry (Buddy) Bussey, III, Atlantic Highlands, NJ (US)

(73) Assignee: ICC Technologies Inc., Marlboro, NJ (US)

( * ) Notice: Subject to any disclaimer, the term of this patent is extended or adjusted under 35 U.S.C. 154(b) by 71 days.

(21) Appl. No.: 12/381,180

(22) Filed: Mar. 9, 2009

(65) Prior Publication Data

US 2009/0233027 A1  Sep. 17, 2009

Related U.S. Application Data

(62) Division of application No. 10/211,683, filed on Aug. 2, 2002, now abandoned.

(51) Int. Cl.
| | |
|---|---|
| F16L 11/02 | (2006.01) |
| F16L 11/04 | (2006.01) |
| B32B 5/02 | (2006.01) |
| B32B 5/18 | (2006.01) |
| B32B 5/24 | (2006.01) |

(52) U.S. Cl. ............ 428/36.1; 428/35.6; 428/36.2; 428/36.5; 428/36.9; 428/36.91; 442/50; 442/56; 442/58

(58) Field of Classification Search .......... 428/34.1, 428/34.2, 34.3, 35.6, 35.7, 35.8, 35.9, 36.1, 428/36.2, 36.4, 36.5, 36.9, 36.91; 442/50, 442/56, 58
See application file for complete search history.

(56) References Cited

U.S. PATENT DOCUMENTS

| | | | | |
|---|---|---|---|---|
| 4,753,762 | A * | 6/1988 | Li et al. ..................... | 264/54 |
| 5,015,123 | A * | 5/1991 | Houck et al. ................ | 405/45 |
| 7,452,165 | B2 * | 11/2008 | Tyler ........................ | 405/302.6 |

* cited by examiner

Primary Examiner — Walter B Aughenbaugh
(74) Attorney, Agent, or Firm — Francis C. Hand; Carella, Byrne, et al.

(57) ABSTRACT

A laminated construction having a first layer having a plurality of criss-crossing foamed filaments adhered to each other and defining a net, an impermeable layer laminated to the first layer along two opposite longitudinal edges to form a sleeve, and a perforated pipe extending within the sleeve. In another embodiment, a porous membrane surrounds the layer having a plurality of criss-crossing foamed filaments adhered to each other. In another embodiment, the laminated construction forms a pipe having a first layer having a plurality of criss-crossing foamed filaments adhered to each other and defining a net, an impermeable layer laminated to the first layer along two opposite longitudinal edges to form a sleeve, and a plurality of loose fill elements are within the sleeve for passage of fluid therethrough.

12 Claims, 3 Drawing Sheets

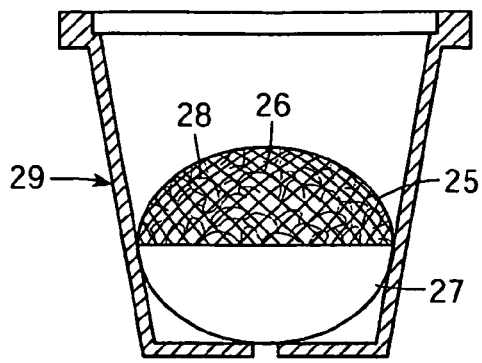
FIG. 10
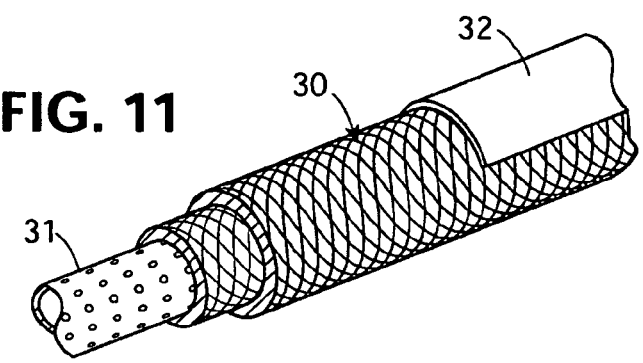
FIG. 11
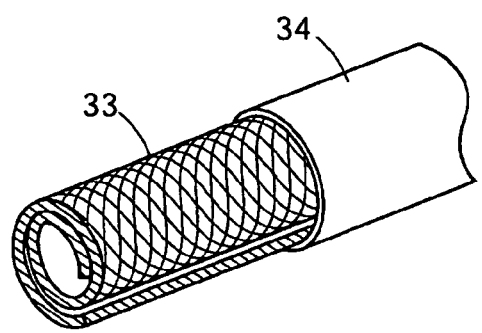
FIG. 12
FIG. 13
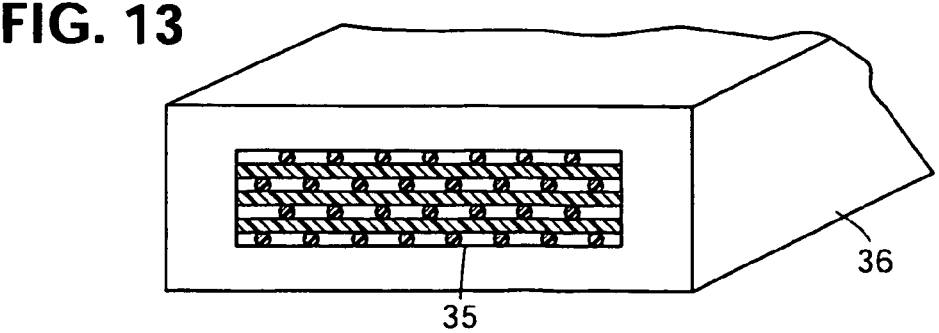

FOAMED LAMINATED CONSTRUCTION

This is a Division of Ser. No. 10/211,683, filed Aug. 2, 2002, now abandoned.

This invention relates to a foamed laminated construction. More particularly, this invention relates to a foamed laminated construction for use in insulation, packaging, piping, pool covers and other purposes.

As is known many types of foam materials have been employed for insulation purposes. In some cases, foam materials have been blown into spaces between the studs of a wall in order to provide insulation. In other cases, panels have been formed of foam materials and mounted in place between the studs of a wall or to form a wall.

Foamed materials have also been used for packaging purposes. For example, foamed polystyrene and similar materials have been used to make loose fill materials of various shapes for packaging purposes.

Foamed plastic materials have also been used in drainage systems. For example, as described in U.S. Pat. No. 5,015,123 foamed plastic materials have been disposed around a perforated pipe and held in place by a netting so that effluent may flow from the pipe through the plastic materials and netting out of the pipe.

It is an object of the invention to provide a laminated construction that can be employed as a cushioning material and as an insulation medium.

It is another object to the invention to provide a foamed structural member that can be used as an insulation medium.

It is another object of the invention to provide a foamed structural member that may be used for piping.

It is another object to the invention to provide a foamed member that may be used for packaging purposes.

Briefly, the invention provides a laminated construction employing a layer of net material formed of a plurality of criss-crossing foamed filaments that are adhered to each other to define a mesh-like structure, i.e. net.

The foamed filaments are made of any suitable material such as a polymer material, e.g. polystyrene, polyethylene, and polyurethane, a starch material or any material that can be foamed.

In one embodiment, two or more layers of the same material are laminated to one another with the openings of each layer in alignment with the openings of the adjacent layer. The laminated construction may be used in sheet form to form a cushioning sheet for packaging purposes. The layers may also be built up to provide a thickness suitable to form a cushion. Likewise, the layers may be built up to provide a block of material which can be cut out to form recesses to receive items for packaging purposes. In this case, the block of material requires less material than presently used blocks of foam plastic materials. This is due to the fact that the laminations of the block have a generally controlled amount of free space between the filaments. That is to say, each lamination may be fabricated with a controlled thickness of filament and spacing between filaments. Thus, the greater the spacing between filaments, the less weight per lamination. The weight of the resulting block of material can easily be less than one-half the weight of a corresponding block of foam plastic material.

In another embodiment, a laminated construction may be formed of a plurality of layers of foam filaments disposed in alternating relation with a plurality of laminations that bond adjacent layers of foamed filaments together whereby the air spaces in each said layer of foamed filaments are sealed. These laminations may be made of a plastic material, such as polyethylene, that can be heated, for example to 300° F., to heat seal the adjacent layers of foamed filaments together.

The laminations may be relatively thin as compared to the layers of foamed filaments, for example, being of a thickness of 1 mil.

In a case where the foamed filaments are made of starch, the layers may be bonded to each other simply by applying steam to the opposed surfaces of the layers to wet the surfaces and to bond the filaments together.

The layers may also be laminated together with the openings of each layer out of alignment in order to provide less cushioning as the resistance to a compressive force is less.

In another embodiment, the layers may be made of dissimilar materials. For example, some of layers may be made of polystyrene foam and others of the layers may be made of polyethylene foam.

In still another embodiment, a layer of a different material may be laminated to one or both sides of a foamed layer or to one or both sides of a laminated construction. For example, the added layer may be made of a material selected from the group consisting of paper, plastic, and metal foil. In this embodiment, the laminated construction may be employed for insulation purposes. For example, rolls of the laminated construction may be used as a substitute for conventional fiberglass insulation in the walls of a building. In such a case, a foil layer disposed over one side of the laminated construction is used for reflecting heat. Further, the laminated construction and may be made of a width to fit in friction fit relation between a pair of elongated supports, such as studs, and is characterized in having a lateral stiffness sufficient to be frictionally held between the pair of elongated supports without the need for holders, such as staples, nails or the like.

When used for insulation purposes, the laminated construction may be easily put in place since there is no need for holders. Likewise, the laminated construction may be easily removed when no longer needed. This is particularly advantageous when the laminated construction is used as insulation in the walls and ceiling of a chicken coop that requires substantial cleaning and removal of the insulation on the walls and ceilings after a flock of chickens has been removed for processing and a fresh flock is to be housed.

In still another embodiment, a layer of foamed material in strip form may be laminated to an impermeable layer of strip form along two longitudinal edges to form a sleeve which may be opened to form a pipe or a conduit or into which a perforated pipe may be slid for use in a drainage or septic tank environment.

In still another embodiment, a layer of foamed material may be sandwiched between a transparent layer and an opaque layer for use as a cover for a swimming pool. In this case, the spaces formed in the foamed layer become sealed by the transparent layer and opaque layer so that air is trapped in the spaces. Advantageously, the layer of foamed material would be made, for example, of recycled foamed plastic material that is opaque and preferably black in color. In use, the transparent layer would be positioned as the top layer of the pool cover so that sunlight may pass through and heat the foamed layer. The heat generated in the foamed layer would permeate into the bottom layer and would also heat the air trapped in the spaces or cells defined by the foamed layer. Thus, when a pool is not in use, the pool cover can be used to retain heat within the water in the pool while also transferring heat from sunlight into the water. Further, the heat that is trapped in the air spaces of the foamed layer can be transferred to the pool water at a later time.

Such a laminated construction may also be used as a ground cover in order to keep the ground warm, particularly where plants, shrubs and trees are planted.

The laminated construction may be fabricated so that each layer has a weight of from ¼ pounds to 10 pounds per cubic foot. As such, the laminated construction is of relatively low weight.

In still another embodiment, a layer of the foamed material may be sandwiched between a plastic film and a sheet of paper for use in making a bag. In this case, the laminated construction may be folded over on itself and secured along two sides in a conventional manner to form a bag with an open end. The resulting bag would have soft cushioning characteristics. The layer of foamed material would take the place of plastic films that have pockets or bubbles formed therein.

In still another embodiment, one or more layers of the foamed material may be used for wrapping about a perforated pipe, for example for use in a drainage system or in a septic tank system. In this embodiment, a wrapped pipe could be placed against a foundation wall so that water might permeate through the openings of the foamed material and then into the pipe for transfer away from the foundation wall. Also, when used in a septic tank system, effluent may pass from the pipe outwardly through the openings of the foamed material and into a leaching field or the like. In either case, in order to prevent sediments from passing into and clogging the openings of the foamed material, a porous membrane such as a silk sock may be placed about the layer of foamed material to prevent passage of the sediments into the openings of the following material.

In still another embodiment, a layer of foamed material may be wound on itself to form a cylinder that could be placed in a sleeve of permeable or impermeable. For example, such a cylinder could be used as a boom to contain an oil slick on a body of water. Alternatively, a plurality of layers of foamed material may be formed into a block that is then cut to size to form a boom. In either case, the resulting structure is of less weight than a conventional foamed plastic material. For example, the resulting structure may be less than one-half the weight of a conventional foamed plastic material.

In still another embodiment, a plurality of layers may be disposed in overlying relation and fabricated to form a one piece block with each layer having a plurality of criss-crossing foamed filaments adhered to each other and defining a mesh-like structure with a multiplicity of air spaces of predetermined size therein. Such a foamed block may have one or more recesses formed therein to pass through at least some of the layers to receive an item therein, for example for packaging purposes. Such a block would be of substantially less weight than a conventional foamed block of similar shape and dimensions.

The foamed block may also be used in the construction of floating concrete docks. For example, a laminated block of the foamed material, for example 12 feet by 6 feet by 16 inches, may be placed in a plastic bag or wrapped in a sheet of plastic and used as a core about which concrete may be poured so that upon setting of the concrete, the resulting concrete dock is of substantially less weight than a solid concrete block. In this case, the amount of free space that is contained within the laminated block of foamed material serves to reduce the overall weight from the concrete block. Where used, the plastic wrapping serves to prevent the concrete from entraining into the pores of the laminated block.

In still another embodiment, the foamed material may be used as a protective sheet between items that are being shipped together in a stack in order to avoid scratching of the items on each other and/or slippage of the items on each other since the foamed material has a coefficient of friction that prevents the items from sliding. In such cases, a plastic film may be laid over a layer of the foamed material to protect the items from each other while the foamed material provides for cushioning. Also, a layer of the foamed material may be sandwiched between two highly polished sheets. Thus, a relatively high stack of items may be shipped with a reduced risk that the items will slide relative to each other.

The foamed material may also be used for expansion joints in sidewalks, insulation in automobile doors, and many other uses.

These and the other objects and advantages of the invention will become a more apparent from the following detailed description taken in conjunction with the accompanying drawings wherein:

FIG. 10 illustrates a part cross-sectional view of a foamed member for use in a flower pot;

FIG. 11 illustrates a view of a perforated pipe wrapped with multiple convolutions of a foamed sheet in accordance with the invention;

FIG. 12 illustrates a part perspective view of a web of the foamed sheet wond on itself and placed in a sleeve in accordance with the invention; and FIG. 13 illustrates a part cross-sectional view of a concrete dock constructed in accordance with the invention.

Figure 1:
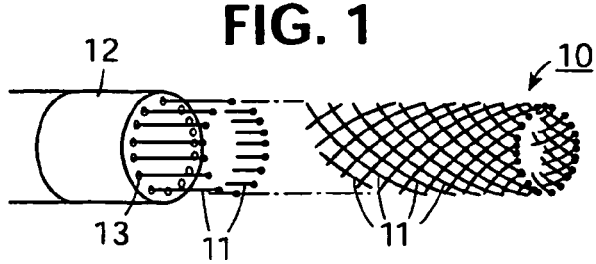
FIG. 1 illustrates a schematic view of a manner of making a layer of foamed material in accordance with the invention.

Referring to FIG. 1, a foamed tube 10 is made in a conventional manner. In this respect, a plurality of filaments 11 of foamable material, such as polyethylene, polystyrene, starch and the like, are extruded through a die 12 having openings 13, for example of circular shape, that are disposed in the circular array. At a point downstream of the die 12, the filaments 11 are crossed over each other. During this time, the individual filaments 11 become integral with each other at the points of crossing to form the tube 10. Subsequently, the tube 10 is slit longitudinally and flattened in order to form a rectangular sheet 14 of net material, i.e. a mesh-like structure, as indicated in FIG. 2, for example of a width of 4 feet.

Where the filaments 11 are made of a thermoplastic material, the filaments 11 bond to each other at the points of crossing.

Where the filaments 11 are made of a foamable starch material, a mist may be applied at the points where the filaments cross in order to enhance securement of the filaments to each other.

Figure 2:
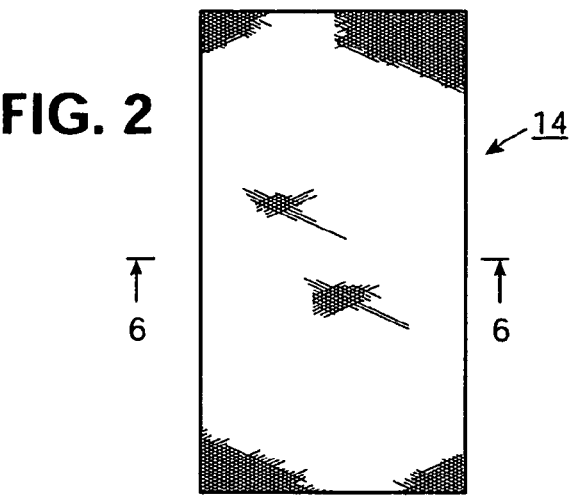
FIG. 2 illustrates a layer of foamed material in accordance with the invention.

Referring to FIG. 2, the individual filaments 11 of the sheet 14 cross over each other on a relatively small acute angle relative to a longitudinal axis such that the mesh openings are of an elongated diamond shape with the walls of equal length that are at acute angles to each other at the leading and trailing ends of the opening. Thus, the sheet 14 is characterized in being laterally stretchable with limited longitudinal stretchability. The crossing angle of the filaments 11 may be greater or less to obtain mesh openings lying between an elongated diamond shape as shown in FIG. 2 or a square shape as shown in FIG. 3.

Figure 6:
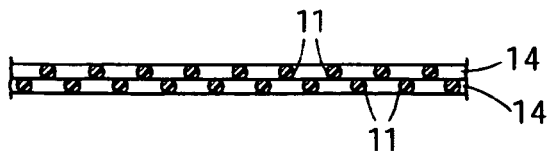
FIG. 6 illustrates a view similar to FIG. 5 with the openings of adjacent layers of the laminated construction out of alignment with each other.

Referring to FIG. 6, the filaments 11 of the sheet 14 are disposed in two layers with the filaments of each layer being parallel to each other and angularly disposed to the filaments 11 of the other layer. For purposes of simplicity, the cross-section of each sheet 14 is illustrated in the remaining Figs. as that of a single layer of filaments but is to be understood that each sheet 14 has a cross-section as shown in FIG. 6. The die 12 is provided with a circular array of openings 13, for example of circular shape, to produce filaments 11 having a circular cross-section. The openings are sized so that each filament 11 has a diameter of ⅛ inch. Alternatively, each opening 13 may be rectangular to produce a filament with a flattened cross-section with a width of ¼ inch. The size of the mesh openings may be made of greater or less dimension depending upon the ultimate use of the member fabricated from the sheet 14. Likewise, the size of the filaments may be greater or less than in the above example.

The sheet 14 may be sub-divided into sections in order to fabricate a structural member with the sections laminated one over the other or may be used as is.

Figure 3:
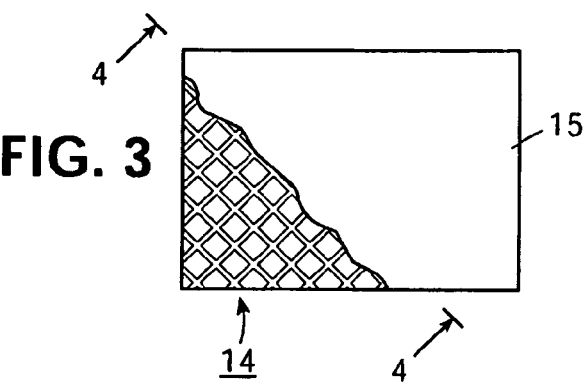
FIG. 3 illustrates an enlarged view of a layer of foamed material with a laminated layer on two sides.
Figure 4:
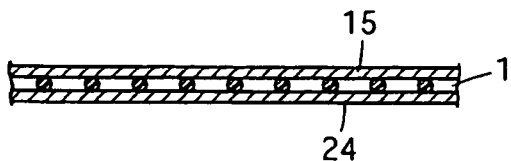
FIG. 4 illustrates a cross-section view taken on line 4-4 of FIG. 3.

Referring to FIGS. 3 and 4, the sheet 14 may have a layer 15, for example, of plastic film, paper, foil or the like laminated to one or both sides to form a laminated construction. In an embodiment where a laminated layer 15 is used on only one side, the layer 15 may be a protective layer with holes or perforations 16 for use in packaging and, particularly, for protection of hard goods that have a finish thereon. In this case, the foamed sheet 14 is placed over the surface of the hard goods while the protective layer 15 protects against damage from the surrounding environment. The perforations 16 in the protective layer 15 also allow air to pass through into the foamed sheet 14. The foamed sheet 14 of the laminated construction allows the surface of the hard goods to breathe and allows the finish to cure faster.

Figure 5:
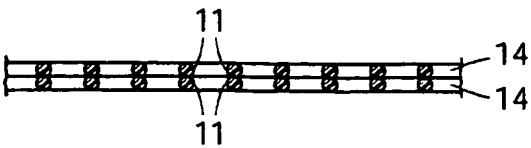
FIG. 5 illustrates a cross-sectional view of a laminated construction in accordance with the invention.

Referring to FIG. 5, a pair of foamed sheets 14 or a pair of sections sub-divided from a single sheet 14 are laminated over each other to form two layers of net material of a laminated construction. As illustrated, the sheets 14 are disposed with the mesh openings in alignment with each other. Alternatively, the sheets 14 may be stacked with the filaments of the overlying sheets offset relative to each other. This embodiment allows less cushioning since the filaments 11 of the layers are out all alignment with each other. Also, the two sheets 14 may be stacked with one sheet rotated 90° relative to the other sheet so that the elongated mesh openings of the sheets 14 are not aligned. In this case, the filaments of one sheet 14 cross laterally over the filaments of the other sheet 14.

The sheets 14 may be made of dissimilar materials, For example, one sheet 14 may be made of polyethylene while the other sheet is made of polystyrene. In this way, different characteristics may be given to a structural unit that is formed of sheets 14 of dissimilar materials.

Referring to FIG. 4, a layer of foamed material 14 may be sandwiched between a transparent layer 15 and an opaque layer 24 for use as a cover for a swimming pool. In this case, the spaces formed in the foamed layer 14 become sealed by the transparent layer 15 and opaque layer 24 so that air is trapped in the spaces. Advantageously, the layer of foamed material 14 would be made, for example, of recycled foamed plastic material that is opaque and preferably black in color. In use, the transparent layer 15 would be positioned as the top layer of the pool cover so that sunlight may pass through and heat the foamed layer 14. The heat generated in the foamed layer 14 would permeate into the bottom layer 24 and would also heat the air trapped in the spaces or cells defined by the foamed layer 24. Thus, when a pool is not in use, the pool cover can be used to retain heat within the water in the pool while also transferring heat from sunlight into the water. Further, the heat that is trapped in the air spaces of the foamed layer 14 can be transferred to the pool water at a later time.

In another embodiment, a layer of the foamed material 14 may be sandwiched between a plastic film 15 and a sheet of paper 24 for use in making a bag. In this case, the laminated construction may be folded over on itself and secured along two sides in a conventional manner to form a bag with an open end. The resulting bag would have soft cushioning characteristics. The layer of foamed material 14 would take the place of plastic films that have pockets or bubbles formed therein.

In still another embodiment, sheets of plastic 15,24 may be secured to opposite sides of a layer of foamed material 14 to form a blank that can be scored for folding, for example in the manner of corrugated paperboard into a carton.

Figure 7:
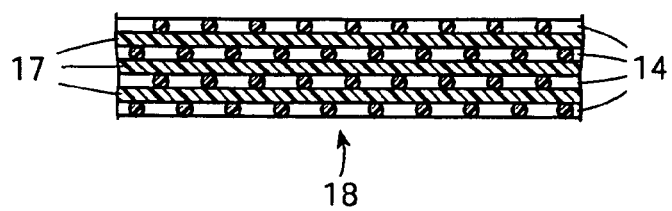
FIG. 7 illustrates a view similar to FIG. 5 of a laminated construction of multiple layers.

Referring to FIG. 7, a multiplicity of sheets 14 may be stacked on each other in alternating relation with a plurality of laminations 17 of impermeable material. For example, four sheets 14 may be stacked with three laminations 17 to form a laminated construction 18 having an increased rigidity. In this case, the filaments 11 of the adjacent sheets 14 may be out of alignment as illustrated or in alignment in a manner as illustrated in FIG. 5.

In order to form the laminated construction 18, after a foamed tube 10 has been cut and formed into a continuous web, the web is rolled up into a roll and delivered to a laminating machine. Four such rolls and then be unwound along with three rolls of impermeable material to supply continuous webs of the layers of foamed filaments in alternating manner with the webs of impermeable material in a stacked manner. Where the webs of impermeable material are made of a plastic, such as polyethylene, heat is applied to cause the plastic to melt or become sufficiently tacky to bond the layers of foamed filaments together. Typically, for a web of polyethylene of 1 mil thickness, the webs are heated to 300 degrees Fahrenheit.

After the layers of foamed filaments 14 and laminations of plastic 17 are bonded together, the resulting laminated structure 18 may be cut into desired lengths and/or widths.

One of the characteristics of the laminated structure 18 is that the air spaces in each layer of foamed filaments 14 become sealed between two laminations of plastic 17. This adds to the rigidity of a laminated structure 18.

The laminated structure 18 is particularly useful for packaging items in recesses that are cut out of a laminated structure 18, for example, in a shape to receive an item in a snug manner.

The laminated constructions of FIGS. 6 and 7 may be used in sheet form to form a cushioning sheet for packaging purposes. The layers may also be built up to provide a thickness suitable to form a cushion. Likewise, the layers may be built up to provide a block of material which can be cut out to form recesses to receive items for packaging purposes. In this case, the block of material requires less material than presently used blocks of foam plastic materials. This is due to the fact that the laminations 14 of the block have a generally controlled amount of free space between the filaments. That is to say, each lamination 14 may be fabricated with a controlled thickness of filament and spacing between filaments. Thus, the greater the spacing between filaments, the less weight per lamination. The weight of the resulting block of material can easily be less than one-half the weight of a corresponding block of foam plastic material.

The laminated constructions of FIGS. 6 and 7 may be built up of several layers and may have one or recesses of predetermined size and shape formed therein, for example, a two and one-half inch diameter recess, to receive an item of larger size, for example, a three inch diameter bottle. In this embodiment, the wall of the recess is defined by the ends of the filaments 11 of each sheet 14 so that when an item of larger size is placed in the recess, the ends of the filaments deform inwardly or flex downwardly to receive the item. Because of the resilient nature of the filaments, the item is thus held in a snug fit manner. Thus, the recess is able to adapt to the size of the item being received. This embodiment is particularly useful in packaging figurines since the figurines can be held in a snug-fit manner rather than in a simple slide fit manner as occurs with previously known foamed plastic blocks that are hollowed out to receive an item.

The recess or recesses formed in a laminated construction of the FIG. 6 or FIG. 7 type to receive an item to be packaged may also pass completely through the laminated construction. In this embodiment, the laminated construction may be made relatively thick to receive an item of lesser thickness in a floating manner, i.e. with the item spaced inwardly of the top and bottom surfaces of the laminated construction.

A laminated construction of the FIG. 6 or FIG. 7 type may also be provided with one or more recesses that are to receive an item or items as above and may be used with a solid foam block or another laminated construction that is not recessed. In this case, the solid foam block or unrecessed laminated construction would be placed on the bottom of a carton and then the recessed laminated construction would be placed on top thereof to receive the item or items to be packaged. In this way, the solid block may provide a stronger base for the packaged items.

Referring to FIG. 5, a laminated construction may be built up of a plurality of sheets 14 for piping purposes, for example to a thickness of 2 inches, a width of 18 inches and a length of 10 feet. In this embodiment, a porous layer in the form of a thin sheet, for example, a 1 mil thick polyethylene film (not shown) is placed over an upper side of the laminated construction and secured only along two longitudinal edges to the laminated construction. The polyethylene film would have a greater width than that of the laminated construction so that the central longitudinal portion of the film is free of the laminated construction. Once this unit is delivered to a site, a perforated pipe would be slid into place between the laminated construction and the film, i.e. the central longitudinal portion of the film. Where water is to pass through the film into or from the perforated pipe, the film would be made porous, for example, in the manner of a silk sock, for the passage of water but not for the passage of soil.

Figure 8:
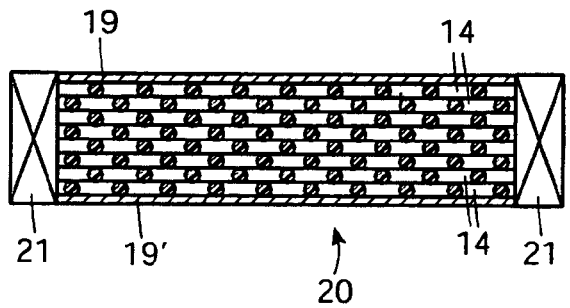
FIG. 8 illustrates a cross-sectional view of a foamed a laminated construction for use as insulation.

Referring to FIG. 8, a plurality of sheets 14 or sub-divisions thereof, for example, 8 layers, each ½ inch in thickness, may be laminated together with or without alternating impermeable laminations and then provided with outer layers 19, 19' to form a panel of insulation 20. One layer 19 may be paper while the other layer 19' is a heat reflective foil. Due to the stiffness of the laminated sheets 14, the resulting insulation panel 20 is relatively stiff in a lateral direction. As such, the panel 20 may be sized of a width to fit between a pair of studs or beams 21 in a friction fit manner so as to avoid a need for fasteners, such as nails, staples or the like. Further, should a need arise to remove a panel 20 from a wall or the like, the panel 20 may be easily removed by hand without interference from any fasteners.

The insulation panel 20 may be made in standard lengths of, for example, 6, 7 or 8 feet to provide insulation for walls, floors and ceilings of a building. Further, the insulation panel 20 may be fabricated in a flat state or in a rolled state so as to provide a longer length.

The insulation panel 20 provides a large volume of dead air space between the outer layers 19,19'. Further, by fabricating foamed sheets 14 with controlled sizes of filaments and mesh openings, the amount of dead air space may be increased or decreased to thereby control the heat insulation factor of the panel. Likewise, fire retardant additives may be added to the extrudate used to make the filaments 11 to thereby increase the fire retardant qualities of the panel 20.

Figure 9:
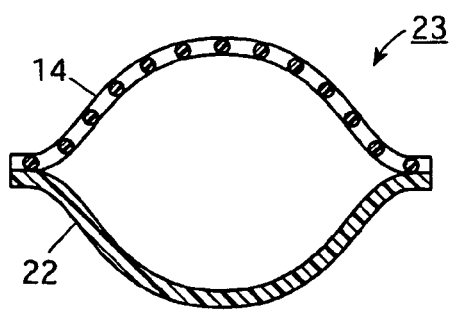
FIG. 9 illustrates a cross-sectional view of a foamed laminated construction for use as a pipe.

Referring to FIG. 9, a foamed sheet 14 or a strip thereof may be secured to a film 22 of impermeable plastic or the like along two longitudinal edges either by use of adhesives, sewing, crimping, or heat sealing. The resulting structure may then be shaped into a generally cylindrical or oval shape to form a pipe 23. The interior of the pipe 23 may be provided with suitable supports to maintain the foamed sheet 14 and film 22 in the opened state. For example, the space within the pipe 23 may be filled with loose fill elements so as to form a pipe suitable for drainage purposes. For example, such a pipe 23 may be provided alongside a foundation, for example a house foundation, in order to provide for drainage away from the foundation.

Alternatively, a perforated pipe (not shown) may be slid between the foamed sheet 14 and film 22. The resulting construction may be used for drainage purposes of alongside a foundation in order to provide for drainage away from the foundation or may be used in a septic tank system to convey effluent out of the pipe and through the foamed sheet 14 into a leaching field.

Referring to FIG. 10, a bag 25 may be formed from a foamed tube 26 and an impermeable or non-porous layer 27, for example of a plastic. The tube 26 is formed in a manner as described above with respect to FIG. 1 and is closed off at the upper end in any suitable manner as by heat sealing or by a staple (not shown) while the open lower end is secured to the non-porous layer 27, such as by heat sealing, crimping, sewing and the like. As illustrated the non-porous layer 27 is of a size to form a pocket that extends from the tube 26.

The bag 25 may be filled with loose fill elements 28 of expandable polystyrene or other suitable aggregate to function as plant growing medium. That is, the bag 25 may be placed in a flower pot 29 or other like container with the non-porous layer 27 facing down and seated at the bottom of the pot 29. A layer of soil may then be placed over the bag and a plant embedded in the soil in a conventional manner.

The use of the bag 25 in the flower pot 29 reduces the amount of water needed for the plant to grow since water is not lost by drainage out of the pot 29. Further, the plant is not immersed in a pool of water since the loose fill elements 28 keep the plant above the water line and allow only the roots of the plant to grow down through the elements 28 to the water line. The bag 25 also keeps water in the pot as a reserve water supply.

Referring to FIG. 11, a web 30 of the foamed sheet may be wrapped about a perforated pipe 31 for use in a drainage system or a septic tank system. In addition, a porous or permeable membrane 32, such as a silk sock, is placed about a portion of the upper outer surface of the web 30 to prevent sediment from passing into the web 30. In this respect, the web 30 takes the place of foamed aggregate that has been placed about a perforated pipe in prior art constructions. Consequently, the web 30 not only provides a porous structure but also allows easy fabrication of the web 30 about the pipe 31. That is to say, there is no need to blow the foamed aggregate into a mesh-like membrane fitted about a porous pipe as in the prior art constructions.

Referring to FIG. 12, a layer of foamed material 14 may be wound on itself to form a cylinder 33 that is placed in a sleeve 34 of permeable or impermeable material. For example, such a cylinder 33 could be used as a boom to contain an oil slick on a body of water.

Alternatively, a plurality of layers of foamed material 14 may be formed into a block, for example as indicated in FIG. 7 that is then cut to size to form a boom. In either case, the resulting structure is of less weight than a conventional foamed plastic material. For example, the resulting structure may be less than one-half the weight of a conventional foamed plastic material.

Referring to FIG. 13, a laminated block 35 formed of multiple layers 14 of the foamed material, with or without alternating laminations of an impermeable material, may be used in the construction of a floating concrete dock 36. For example, a laminated block 35 of the foamed material, for example 12 feet by 6 feet by 16 inches, may be used as a core about which concrete may be poured so that upon setting of the concrete, the resulting concrete dock 36 is of substantially less weight than a solid concrete block. In this case, the amount of free space that is contained within the laminated block of foamed material serves to reduce the overall weight of the concrete block. In addition, the concrete is able to enter into the mesh openings of the laminated block 35 to form a secure bonding of the concrete to the block 35. Alternatively, the block 35 may be encased in a sleeve or bag or the like to preclude the concrete from entering into the mesh openings of the block 35. The resulting concrete block would have even less overall weight and a greater amount of voids within the block 35.

As shown in FIG. 11, the web 30 is wrapped around the pipe 31 to form a plurality of concentric layers.

As described above, a laminated construction formed in part of the foamed layer of crisscrossing foamed filaments has many uses and may be made of various foamed plastic materials. For example, the foamed layer may be made of polyethylene that has a high slip characteristic. The foamed layers may also be provided with fire retardants and/or anti-static additives.

As shown in FIG. 12, the layer of foamed material is wrapped on itself to form a plurality of convolutions.

A stack of foamed layers may be laminated on one or both sides with suitable materials to function as insulation. Also, laminations may be added to the outside and/or in alternating manner to stiffen the laminated construction for use as a structural element.

The invention thus provides a laminated construction that can be made in a relatively inexpensive manner and that can be fabricated into multilayer constructions to provide multiple uses.

What is claimed is:

1. A laminated construction comprising
   a longitudinally disposed first layer having a plurality of criss-crossing foamed filaments adhered to each other and defining a net with a multiplicity of openings therein;
   a longitudinally disposed impermeable layer laminated to said first layer along two opposite longitudinal edges to form a sleeve; and
   a perforated pipe extending longitudinally within said sleeve for passage of fluid between a space within said pipe and said openings in said first layer.

2. A laminated construction as set forth in claim 1 further comprising a porous membrane about a portion of said sleeve to prevent passage of soil into said openings in said first layer.

3. The combination as set forth in claim 1 wherein said layers are made of dissimilar materials.

4. The combination as set forth in claim 1 wherein each said filament is of circular cross section with a diameter of ⅛ inch.

5. The combination as set forth in claim 1 wherein each said filament is of flattened cross section with a width of ¼ inch.

6. The combination as set forth in claim 1 wherein each said layer has a weight of from ¼ pounds to 10 pounds per cubic foot.

7. The combination as set forth in claim 1 wherein said filaments are made of starch.

8. A laminated construction as set forth in claim 1 further comprising a plurality of loose fill elements within said sleeve for passage of fluid therethrough.

9. In combination;
   a perforated pipe;
   a layer of porous material wrapped concentrically around said pipe, said layer having a plurality of criss-crossing foamed filaments adhered to each other and defining a mesh with a multiplicity of openings therein to contain air; and
   a porous membrane surrounding said layer to prevent passage of soil into said openings in said layer of porous material.

10. The combination as set forth in claim 9 wherein said layer is wound on itself to form a cylindrical shape.

11. The combination as set forth in claim 9 wherein said layer of porous material is wrapped around said pipe to form a plurality of convolutions.

12. A pipe for drainage purposes comprising
    a longitudinally disposed first layer having a plurality of criss-crossing foamed filaments adhered to each other and defining a net with a multiplicity of openings therein;
    a longitudinally disposed impermeable layer laminated to said first layer along two opposite longitudinal edges to form a sleeve; and
    a plurality of loose fill elements within said sleeve for passage of fluid therethrough.

* * * * *